Jan. 11, 1938.  B. E. PRICE  2,105,262
FLUID METER
Original Filed Aug. 21, 1933  3 Sheets-Sheet 1

Inventor
Bailey E. Price,
By Watson, Coit, Morse
& Grindle
Attorney

Jan. 11, 1938.  B. E. PRICE  2,105,262

FLUID METER

Original Filed Aug. 21, 1933  3 Sheets-Sheet 2

Jan. 11, 1938. B. E. PRICE 2,105,262
FLUID METER
Original Filed Aug. 21, 1933 3 Sheets-Sheet 3

Inventor
Bailey E. Price,
By Watson, Coit, Morse
& Grindle
Attorney

Patented Jan. 11, 1938

2,105,262

UNITED STATES PATENT OFFICE 2,105,262

FLUID METER

Bailey E. Price, Dallas, Tex.

Application August 21, 1933, Serial No. 686,156
Renewed June 9, 1937

16 Claims. (Cl. 73—200)

This invention relates to fluid measuring apparatus, and particularly to such apparatus for measuring mixed fluids issuing from oil wells in order to obtain an indication of the total quantity of each constituent contained in the mixture.

It is a general object of the present invention to provide novel apparatus for measuring the liquid constituents of the fluid mixture delivered from an oil well.

An important feature of the invention resides in the measuring of total quantities of the liquid constituents of a mixed fluid by causing: segregation of the gaseous constituents; weighing of the remaining mixed liquid constituents; registering the weight in terms of volume of one of the constituents; and computing the quantity of each constituent in accordance with this registered volume and the relative proportions of the constituents as integrated over a period of time.

An important feature of the apparatus for measuring the quantity of the liquid constituents is the provision of automatic weighing apparatus for weighing the total quantity of liquid passing therethrough and having means for registering the equivalent volume of one of the constituents, used as a base for computations.

Another important feature of the apparatus resides in the construction of a fluid meter of the measuring wheel type wherein each bucket of the wheel is provided with a float extending to the full depth of the liquid in the bucket and associated with apparatus for holding the wheel stationary during filling of the bucket and for releasing the bucket for rotating the wheel and emptying the bucket instantly upon movement of the float, which movement is resisted by the weight of the float and an adjustable spring. The float is so adjusted that its depth of submergence, on release, is such that its buoyancy in the liquid mixture is always the same irrespective of the relative proportions of the constituents of various specific gravities.

A further important feature of the invention resides in the provision of apparatus for retarding the movement of the bucket wheel, prior to the positioning of an empty bucket to receive liquid, and in the shock absorbing apparatus for finally stopping the wheel and positioning a bucket in proper relation to the filling spout, to reduce the shock of high velocities and large momentum and to permit the apparatus to operate more rapidly and with less noise and vibration, and hence to handle a larger quantity of liquid per day.

A still further feature of the invention resides in the provision of means to divert the flow of liquid to the succeeding bucket, during movement of the bucket wheel to dump a filled bucket, in order to insure the measuring of all of the liquid which flows continuously into the meter.

Another important feature of the invention resides in the provision of novel means for separating the entrained oil from the gases, leaving the meter casing at high velocity, and for returning the oil for measurement.

Other and further features and objects of the invention will be more apparent to those skilled in the art upon consideration of the accompanying drawings and following specification, wherein is disclosed a single exemplary embodiment of the invention with the understanding that such changes and variations may be made therein as fall within the scope of the appended claims without departing from the spirit of the invention.

This application is a continuation in part of my application Serial No. 642,118, filed November 10, 1932, for Meters, and relates to apparatus functioning in accordance with the fundamentals of such earlier application but with improved features of construction and operation.

Figure 1:
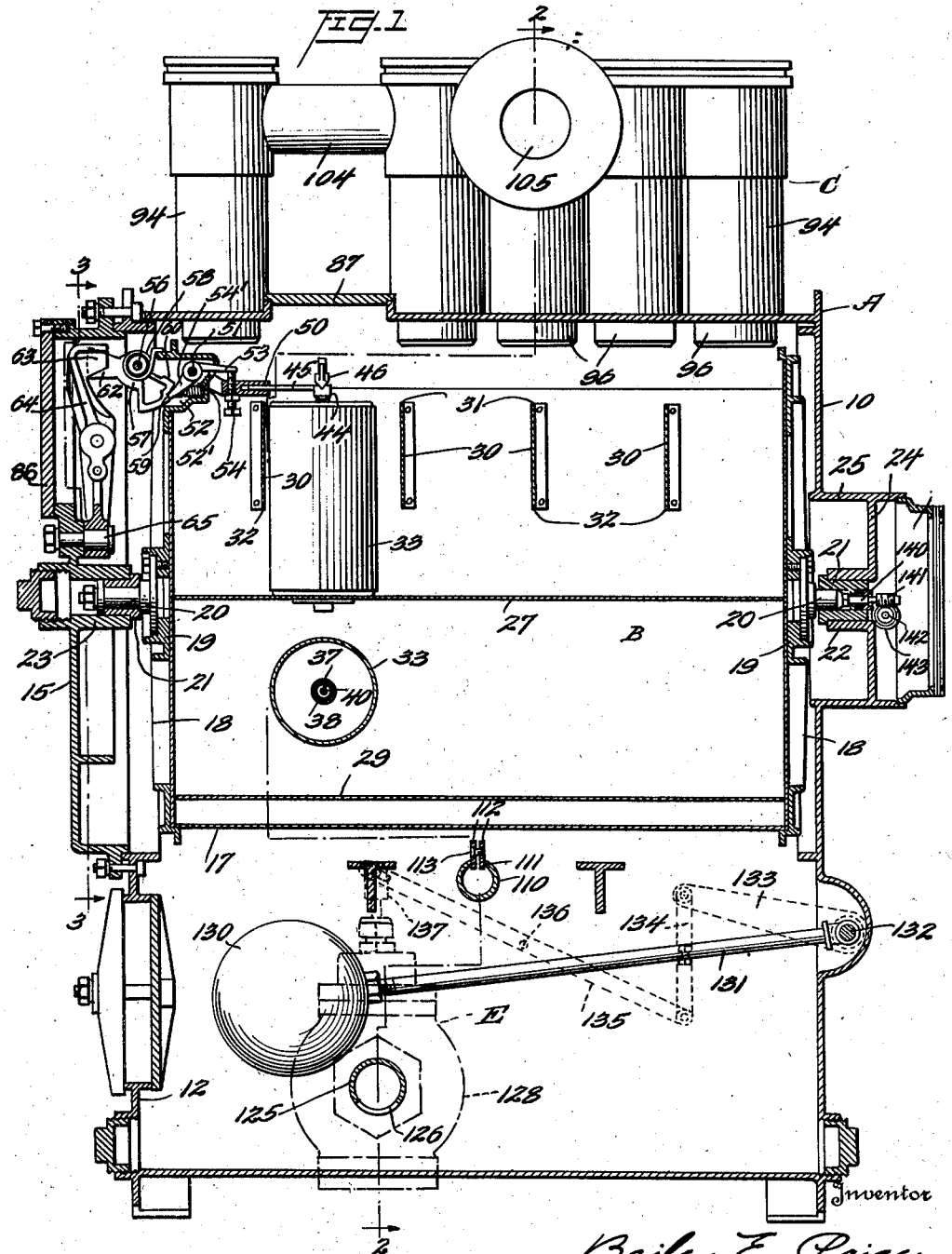
Figure 1 is a longitudinal central section through an oil well meter constructed according to the present invention.

The fluid discharged from an oil well may at times be a mixture of oil, gas and water at a fairly constant temperature but varying in pressure. A well often flows by heads, that is, it may produce any one of the constituents separately for short periods or it may produce any mixture of the three. The function of the meter of the present invention is to measure the volumetric quantity of each of these constituents. The present meter is intended to be connected directly to the discharge pipe from an oil well, either free flowing or pumped, and may be used in most cases, in addition to its function as a meter, as a separator for the gaseous constituents of the fluid.

The meter shown is on a reduced scale from a commercial embodiment for measuring accurately the production of oil wells having outputs up to 2400 barrels per day and up to 50 pounds per square inch working pressure.

The meter consists of six principal parts including the shell or housing A; the measuring bucket wheel or rotor B; the oil separator C; the sampling device D; the level control valve and mechanism E; and the registering mechanism F.

The shell or housing A consists of a cast or welded structure including end member 10, oval tubular portion 11, end member 12 with cleanout and access doors, and the circular head 15 which is removable to permit insertion of the rotor and which carries on its inner face certain mechanism having to do with the movement of the rotor. The shell is constructed gastight and reinforced with suitable radial and longitudinal ribs to prevent bulging from the pressure within, particularly on the flat surfaces, and for support and bracing.

The rotor or measuring bucket wheel B is a sheet steel cylinder 17 having its end walls reinforced by aluminum spiders 18 provided with reinforcing ribs and central hubs 19 to which are bolted the base flanges of the axially disposed trunnions 20 operating in bearings 21 carried respectively in the sleeves 22 and 23, the sleeve 22 being supported in the web 24 in the tubular extension 25 of the casing end 10 whereas the sleeve 23 is integral with the removable head 15. The trunnions mount the rotor freely near the upper part of the casing.

Figure 2:
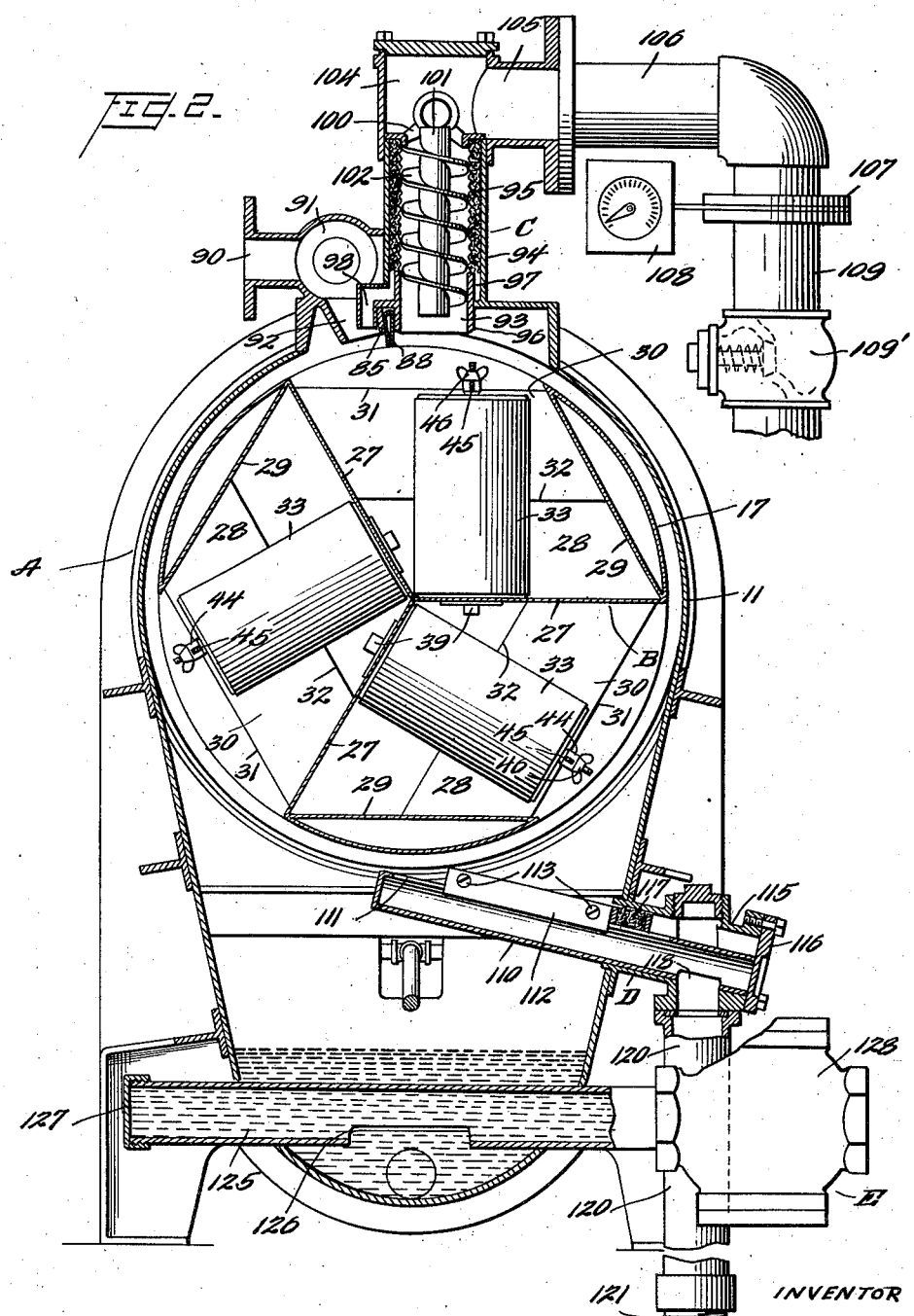
Figure 2 is a transverse vertical section taken on the line 2—2 of Fig. 1.

As seen in Fig. 2, cylinder 17 is divided by radial plates 27 into three equal compartments 28. Parallel to one of the plates 27 of each compartment is a plate 29 forming a chord to one-sixth of the circumference of cylinder 17 and providing a rhomboidal cross-section to each bucket, as clearly seen in Fig. 2. The cylinder 17 is cut away at the outer or open end of each bucket. The uppermost bucket and one in position to receive oil, as shown in Fig. 2, may be defined as having a horizontal bottom, parallel inclined sides and vertical ends so that the quantity of liquid contained therein is directly proportional to the depth of the liquid above the horizontal bottom. This facilitates calibration.

The parallel plates 27 and 29 in each bucket are tied together by several spaced, radial baffle plates 30 each having its edges 31 and 32 substantially parallel to the bottom plate of the bucket. Their ends are turned over and riveted to the side plates of the bucket, as seen in Fig. 1. These plates serve to still the entering liquid and at the same time strongly reinforce the bucket to prevent buckling or bending of the plates.

Figure 4:
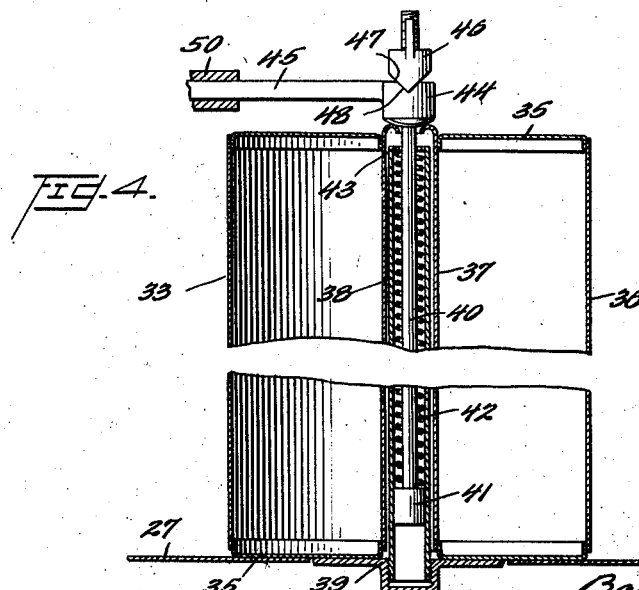
Figure 4 is a central vertical section through one of the hollow metal floats.

Each bucket contains a hollow float 33, shown on enlarged scale in Fig. 4 as comprising a pair of heads 35 connected by cylindrical wall 36 and being secured in a fluid-tight manner to central tube 37 having open ends. This tube has loose sliding fit over guide pipe 38 which is threaded into socket 39 suitably secured to bottom plate 27 of the bucket. Within guide pipe 38 is rod 40 having head 41 loosely guided against the inner walls of the pipe and forming the lower abutment for coil spring 42 surrounding the rod and having as the upper abutment flanged-in end 43 of guide pipe 38. The rod 40 projects up beyond the head of the float and passes freely through head 44 on arm 45 and receives in threaded engagement therewith wing nut 46 having an edge 47 received in notch 48 in head 44 to hold it against unintentional rotation. Adjustment of the wing nut determines the tension of the spring and hence the effort required to lift the float. In other words, the spring and the weight of the float tend to oppose the normal buoyancy of the float and by adjustment of the spring tension the depth of any particular liquid necessary to raise the float from its normal position against the bottom of the bucket is determined.

The bottom of the head 44 rests against an inturned end of the tube 37 so that the arm extends rigidly from the float. The arm 45 is secured in the outer end of a lever 50 having a forked end pivoted on the pin 51 extending chordally across a bay 52 projecting into the bucket from the end wall above the liquid level therein. Also pivoted on this pin between the forks is a trigger lever having arm 53 engaged by the end of adjustment screw 54 on lever 50 and a second or latch arm 54' normally pressed in a clockwise direction by means of coil spring 52' engaged between an abutment on this arm and a socket in the wall of the bay.

Figure 3:
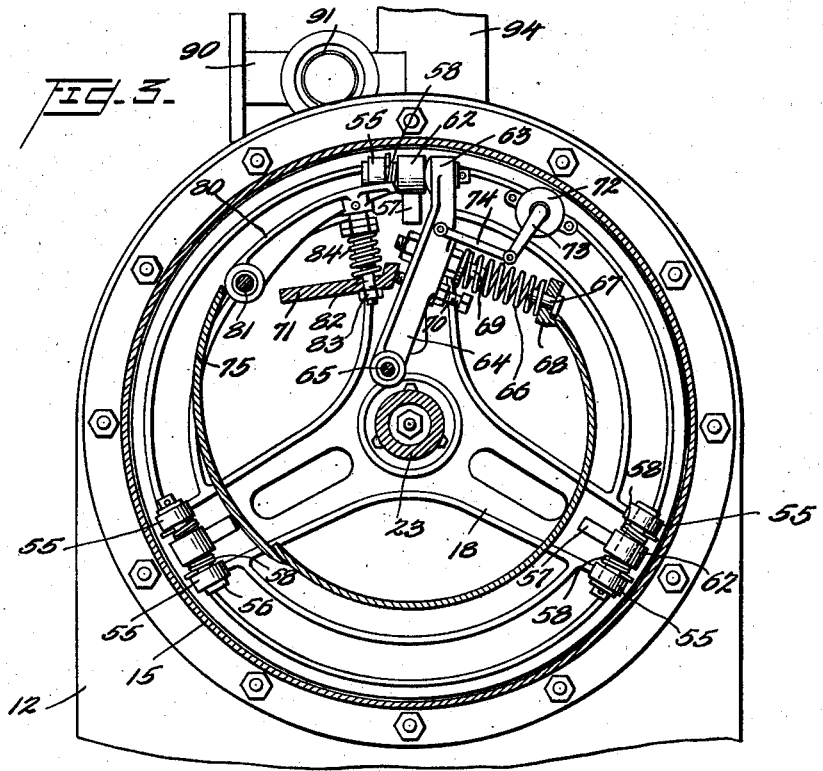
Figure 3 is a transverse vertical section through a portion of the apparatus taken on the line 3—3 of Fig. 1.

As seen in Fig. 3, each arm of the spider on the left end of the bucket wheel is provided at its end with spaced bosses 55 mounting a pin 56 pivotally supporting a stop lug 57, seen in Fig. 1, and normally biased to move in a counterclockwise direction by coil spring 58 but held against such movement by engagement of shoulder 59 thereon with end 54' of the float-actuated lever. When the float is elevated, arm 54' is moved from engagement with the shoulder 59 and the whole stop lug is then rotated by its spring until abutment 60 engages the upper wall of the bay 52. The construction just described permits of sensitive operation of the stop lug, for the only energy required to be expended by the float is that to release the latch which is quite small, the whole effort of turning the stop lug being taken care of by its spring.

The stop lug has arm 62 which normally engages abutment 63 on the end of lever 64 and holds the bucket wheel in position with one bucket up for receiving liquid. Each bucket being equipped with a float arm, release latch and stop lug, it will be seen that when the float in the then upper bucket is lifted to permit its stop lug to be rotated with the end 62 out of engagement with the abutment 63, that the weight of the liquid in the bucket, being off center, will cause the wheel to rotate until the abutment 63 is engaged by the stop lug of the next bucket which is thereby positioned to receive its charge of liquid.

In order to take up the shock of stopping the bucket wheel with its considerable velocity and momentum lever 64 is pivoted at 65 upon a pin secured in head 15 and moves under the impact, resisted by coil spring 66 arranged between pin 67 fastened in block 68 mounted on head 15 and pin 69 secured into arm 64 by a pair of nuts as shown. Counterclockwise movement of arm 64, as shown in Fig. 3, is limited by adjusting screw 70 engaging with rib 71 on head 15.

Further to cushion the shock of impact and to prevent too rapid return of the lever and bucket wheel under the action of spring 66, a suitable shock absorber 72 may be provided which can be of the two-way automotive type equipped with radius arm 73 connected by link 74 to arm 64 near its outer end.

After a stop lug 57 has been released by its latch it must be cocked to place it again in position to engage abutment 63 on lever 64. This is accomplished by eccentric rib 75 on head 15, the outer surface of which is engaged by portion 62 of the stop lug, and as the bucket wheel rotates, moves the stop lug in a clockwise direction about its pivot, as viewed in Fig. 1, until the latch 51 engages shoulder 59 and retains the lug in cocked position.

Just beyond the end of cocking rib 75 is brake shoe 80 pivoted at 81 and having secured to its far end rod 82 passing freely through rib 71 and having adjusting nut 83 to limit movement of the brake member by coil spring 84 surrounding the rod and extending between the brake shoe and rib 71. This brake shoe in its normal eccentric position has most of its length extending out beyond the maximum radius of the cocking rib 75 and which bears against the portion 62 of the locking lug and serves to absorb some of the energy of the wheel just before a locking lug engages the abutment on the movable lever, thereby retarding the wheel and relieving the lever of the duty of fully stopping the bucket wheel. The far end of the brake shoe snaps behind the lug just as it engages the lever abutment and prevents undesired retrograde movement of the bucket wheel when returned by the lever spring.

Access is had to the various adjustments in the stop mechanism by means of removable plate 86 secured to head 15, while access is had to the wing nut on each of the floats by means of a similar removable plate 87 near the top of the casing.

The mixture of oil, water and gas enters the meter by way of a pipe 90 directly from the well. This pipe leads into a transverse manifold 91 of larger diameter to reduce the velocity. From the manifold the fluid is led to an inlet jet 92 so positioned as to deliver fluid into the bucket without striking on top of the float, as clearly seen in Fig. 2. The oil is delivered throughout a considerable length of the bucket to reduce the current in the bucket. In order to insure measurement of all of the oil which flows continuously from jet 92, a wiper bar 85 is secured just behind it (in the direction of rotation of the bucket) and wipes all of the oil delivered during movement of the bucket wheel from the surface of the cylinder 17 into the succeeding bucket which is moving into place for filling. This bar includes a soft material 88 to closely engage the cylinder.

The reduced velocity and pressure both in the manifold 91 and the bucket permit the escape of any gas which is mixed with the oil, which rises during the filling of the bucket and escapes from the casing through a plurality of risers 93 each comprising outer cylindrical shell 94 and inwardly spaced gauze cylinder 95 having the imperforate bottom extension 96 which enters the housing A. Between gauze cylinder 95 and outer cylinder 94 is loosely packed a mass of steel wool. Below the steel wool and between cylinder 94 and the upper end of extension 96 is chamber 97, all of which chambers on the five risers are connected into drain 98 entering the inlet jet. Supported from the top of sleeve 94 by spider 100 is solid cylinder 101 surrounded by a strip of metal wound edgewise thereon to form helix 102 extending between this cylinder and gauze cylinder 95, and forming a helical passage for the gas which escapes with considerable velocity so that as it travels upwardly and spirally the oil particles entrained therein are thrown outward by centrifugal force and caught in the steel wool from whence they dip downward into chamber 97 and are returned for measuring in the bucket then in position.

All risers are capped at the top and are joined into transverse manifold 104 leading into pipe 105 from which pipe 106 leads to coupling 107 containing the calibrated orifice (not shown) associated with flow meter 108 calibrated to register the quantity of gas flowing through the orifice in accordance with well-known practice. The orifice and meter are of standard construction and need not be further described here. The issuing gas leaves by the pipe 109 to be put to whatever use is desired but first passes through a suitable valve 109' to maintain a constant pressure in the meter casing less than that in the wall for delivering the oil therefrom and to also provide a head for the well to work against.

In order to make an accurate computation of the quantity of oil delivered through the meter, there must be known the relative quantities of oil and water so that a factor can be applied to the registered quantity to determine the actual amount of oil. Means are provided for sampling the fluid dumped from each bucket, taking a sufficiently small quantity so that a relatively small total sample results at the end of say a 12 or 24-hour run, which is truly representative of the discharge of the meter integrated over the period even though there may be changes in the ratio of oil to water variously occurring during that time.

A sampling pipe 110 projects from the center of one side of the casing upwardly at a slight angle to beyond the middle of the casing and just below the bucket wheel, as clearly seen in Figs. 1 and 2. This pipe is substantially cylindrical in cross-section and of large diameter so as not to offer any obstruction whatsoever to the movement of the sample. Its upper surface is provided with slot 111 to the walls of which are radially secured the flat metal strips 112 substantially parallel to each other and spaced apart only about $\frac{1}{16}$ of an inch. They are joined by screws 113 which permit of adjusting the width of the slot exposed between the strips, by flexing the metal of the pipe, to regulate the size of the sample taken with each dumping of the wheel. It will be noted that the strips are of such length that they extend completely across the width of the stream being dumped from the bucket so that a true cross-section of this stream is taken, insuring a sample at each dumping of the bucket in which the ratio of oil to water is exactly the same as that in the bucket. Since during the filling of the bucket there is a tendency toward stratification due to the differences in specific gravities of the two fluids, it will be clear that a true cross-section of the bucket anywhere along its length will be representative of the contents of the bucket.

The sampling pipe is carried by fitting 115 secured to the side of the casing and have removable head 116 permitting withdrawal of the pipe for cleaning, adjustment and inspection. Suitable packing 117 is provided where strips 112 pass through the casing wall to prevent leakage at this point during sampling. Near its outer end the bottom of the sampling tube is provided with aperture 118 which leads into the upper end of glass graduate tube 120 which for a 2400-barrel meter is about 3 inches in diameter and 3 feet long to be of adequate size to handle a sample for 12 or 24 hours. This tube may be suitably graduated to enable quick determinations of the relative quantity of the two fluids therein, and is provided at the bottom with removable screw plug 121 so that the sample can be drained out for further analysis and to make room for the sample for the next run.

In order to prevent escape of gas into the oil discharge line from the meter casing, there is provided apparatus for maintaining a constant oil level in the bottom of the casing. The oil is discharged from the casing through discharge pipe 125 extending clear through the casing near the bottom thereof, as seen in Fig. 2, and having cut-out 126 in the central lower part for entrance of oil into the pipe. The far end of the pipe extends out of the casing and is capped at 127 for convenience in cleaning, and the opposite end of the pipe is fitted with any standard form of balanced valve 128 to control the discharge from the casing into the pipe which leads the oil away from the meter for storage. This valve is under the control of float 130 mounted on arm 131 pivoted at 132 on a cross shaft journalled in a protuberance in the end wall of the casing. On the outside of the casing arm 133 connected to this shaft is associated by means of a link 134 and lever 135 pivoted at 136 with the operating rod 137 of the valve 128. This mechanism in the well-known manner maintains a constant level of oil above the entrance to the discharge pipe to insure a continuous gas pressure in the casing to eject the oil and the gas and to prevent anything but liquid issuing from the discharge pipe at the bottom.

In order to record or register the quantity of liquid passing through the meter, shaft 140 extends coaxially from the right hand trunnion 20 and carries on its outer end worm 141 cooperating with worm wheel 142 on a suitable counter 143. In the size meter just described, each bucket holds one-third of a barrel (U. S. 42 gallons), so that for each revolution of the bucket wheel one barrel of fluid is measured. The simple counter 143 may be augmented by suitable recording instruments of either the dial or roller type driven by a clock of electric or spring construction with a pen describing a curve to show all phases of production of the well during a 24-hour period, but since such devices are well-known and form no part of the present invention, it is not deemed advisable to describe them more in detail.

The meter of the present construction has many advantages, among which may be mentioned the ability to handle a mixture of liquids, gases and carried solids with an accurate determination of the quantity of each, its ability to measure liquids or gases alone, and its action as a separator which permits it in most cases to supplant the expensive separator now used in connection with most oil wells. It further functions as a gas trap, and is so constructed that it will not be affected by corrosion, paraffin or foreign matter. The construction is so simple and rugged that it is substantially foolproof and can be adjusted and repaired in the field with the simplest of tools.

The meter by virtue of its release mechanism operated by a float which must have a fixed buoyancy in order to release a dump bucket, is truly a weighing device rather than a quantity measuring device, so that the recording although in barrels is not an indication either of the total quantity of liquid by volume that passes therethrough or of the quantity of oil. It can rather be said to represent the water equivalent of the total amount of liquid passing through, that is, if all the liquid passing through were water, then the amount registered by the counter mechanism would be a true indication of the number of barrels of water passing. Since, however, the specific gravity of water and oil are different, this state of facts is not true under any conditions except for water. Therefore to determine the quantity of oil certain computations are necessary.

In the bucket being filled, the following relations hold true:

1. The volume of liquid varies directly as the depth.

2. The buoyancy of the liquid is directly proportional to its density. Hence the lighter the liquid the greater the quantity to provide the buoyancy necessary to overcome the spring and release the locking dog.

3. The force exerted by the helical spring holding the float to the bottom of the bucket is directly proportioned to the strain or reduction in length thereof.

The density of the oil and the water are known by previous measurement, and the meter is calibrated for water of a similar density to that in the well to be metered by placing a definite amount of water in each compartment and adjusting the wing nuts for the float tension springs so that the lugs trip when there is a definite measured quantity of water in each of the compartments. The mixture of oil and water has less density than water, so that the buoyancy of the mixture is less and the float must be more deeply submerged to exert the same pressure against the spring as did the water alone in order to trip the lug and release the bucket so that more liquid will be in the compartment in an inverse ratio as its density to that of water.

To obtain the total amount of oil produced from the recorded water equivalent, it is first necessary to determine the total amount of water produced by multiplying the percentage of water, by volume, as shown by the samples in the sampling tube, by the total quantity registered by the meter. This then gives the exact quantity of water which has passed through the meter and if this amount be subtracted from the water equivalent recorded by the meter and the remainder divided by the specific gravity of the oil, the quotient will be the actual quantity of oil, in barrels, produced.

Having thus described the invention, what is claimed as new and desired to be secured by Letters Patent is:

1. In a meter of the type described, in combination, an unbalanced dump bucket, a float adapted to float in the liquid therein, means holding the bucket in position and released by the float on reaching a predetermined height in the bucket, and means resisting movement of the float with a force substantially proportional to the elevation thereof.

2. In a meter of the type described, in combination, an unbalanced dump bucket, a float adapted to float in the liquid therein, means holding the bucket in position and released by the float on reaching a predetermined height in the bucket, and a spring continuously resisting upward movement of the float.

3. In a meter of the type described, in combination, an unbalanced dump bucket, a float adapted to float in the liquid therein, means holding the bucket in position and released by the float on reaching a predetermined height in the bucket, means resisting movement of the float with a force substantially proportional to the elevation thereof, and means to adjust said float movement resisting means while maintaining the release position constant to permit measuring liquids of different specific gravity.

4. In a meter of the type described, in combination, an unbalanced dump bucket in which the capacity varies directly as the depth of the liquid therein, a float in said bucket extending from the bottom to above the highest liquid level therein, means holding the bucket in position and float controlled release means therefor actuated only when the float attains a predetermined buoyancy.

5. In a meter of the type described, in combination, an unbalanced dump bucket in which the capacity varies directly as the depth of the liquid therein, a float in said bucket extending from the bottom to above the highest liquid level therein, means holding the bucket in position, float controlled release means therefor actuated only when the float attains a predetermined position, and means resisting elevation of the float and adjustable to determine the depth of liquid necessary to release the bucket.

6. In a fluid meter, in combination, a casing, a bucket wheel mounted for rotation in said casing and having at least three similar buckets, means to position the wheel with successive buckets at the top, means closing a portion of the periphery of the wheel between each two buckets, each bucket when at the top having its load off center to dump automatically by turning the wheel when released, means to deliver fluid continuously to the casing and into the upper bucket and wiper means adjacent the delivery means in the direction of rotation of the wheel therefrom to divert the fluid into the succeeding bucket over said closed peripheral portion during movement of the wheel to dump a filled bucket.

7. A measuring bucket for a fluid meter having a cross section such that the quantity of liquid therein is directly proportional to the depth of liquid, release means for dumping the bucket and a float in said bucket and extending the full depth of the liquid therein to actuate said release means whereby a definite gross weight of several liquids of different specific gravities can be measured.

8. In a fluid meter, in combination, a casing, a bucket wheel mounted for rotation in said casing and having a plurality of similar buckets, a lug carried by the casing, a dog carried by each bucket and adapted to engage the lug to hold the bucket near the top of the wheel but off center so that it will dump when released, means to deliver fluid into the top bucket, a float in each bucket, a spring biasing each dog to a position out of engagement with said lug and latch means controlled by its float to hold each dog in position to engage the lug and releasable when its float is buoyed by the liquid.

9. In a fluid meter, in combination, a rotatably mounted, multi-bucket wheel, means to successively position each bucket near the top of the wheel for filling including, a substantially stationary lug, a dog carried by each bucket and adapted to be positioned to engage the lug to stop rotation of the wheel during filling of its bucket, means biasing each dog to a position to clear the lug, a latch to hold each dog in lug engaging position, a float in each bucket to actuate its latch when buoyed by the liquid therein and means to automatically cock each dog on its latch, after release, by the rotation of the wheel on dumping.

10. In a fluid meter, in combination, a rotatably mounted, multi-bucket wheel, means to successively position each bucket near the top of the wheel for filling including, a substantially stationary lug, a dog carried by each bucket and adapted to be positioned to engage the lug to stop rotation of the wheel during filling of its bucket, a float in each bucket, means actuated by each float to control the movement of its dog to release the lug and dump the bucket by the offset weight of its contents, and means engageable by the dog on the bucket moving to filling position to brake the wheel prior to engagement of the lug and dog.

11. In a fluid meter, in combination, a rotatably mounted, multi-bucket wheel, means to successively position each bucket near the top of the wheel for filling including, a lug, a dog carried by each bucket and adapted to be positioned to engage the lug to stop rotation of the wheel during filling of its bucket, a float in each bucket, means actuated by each float to control the movement of its dog to release the lug and dump the bucket by the offset weight of its contents, means engageable by the dog on the bucket moving to filling position to brake the wheel prior to engagement of the lug and dog, means resiliently supporting said lug and a shock absorber for the lug to reduce the shock of stopping the wheel.

12. In a fluid meter, in combination, a casing, a multi-bucket wheel rotatably mounted therein, means to successively position each bucket near the top of the wheel for filling including an arm pivoted on said casing, a lug on said arm, a dog carried by each bucket and adapted to be positioned to engage the lug to stop rotation of the wheel during filling of its bucket, a float in each bucket, means actuated by each float to control the movement of its dog to disengage the lug and rotate the wheel to dump the bucket by the offset weight of its contents, a stop for said arm, and resilient means biasing said arm against the stop and serving to cushion the shock of engagement of the dogs and lug.

13. In a fluid meter, in combination, a casing, a multi-bucket wheel rotatably mounted therein, means to successively position each bucket near the top of the wheel for filling including an arm pivoted on said casing, a lug on said arm, a dog carried by each bucket and adapted to be positioned to engage the lug to stop rotation of the wheel during filling of its bucket, a float in each bucket, means actuated by each float to control the movement of its dog to disengage the lug and rotate the wheel to dump the bucket by the offset weight of its contents, a stop for said arm, resilient means biasing said arm against the stop and serving to cushion the shock of engagement of the dogs and lug, means to engage each dog prior to contact between the dog and lug, to brake the bucket wheel, said means engaging behind the dog on engagement with the lug to prevent retrograde movement of the wheel under the action of said resilient means.

14. In a fluid meter, in combination, a closed casing, liquid measuring means in the upper part of said casing adapted to discharge into the casing, means to deliver a mixture of liquid and gas into said casing and measuring means, a discharge port near the bottom of said casing for liquid, means controlling said port to maintain a substantially constant liquid level in said casing, a gas discharge port near the top of said casing and means to separate entrained liquid from the gas issuing from the gas discharge port and return this separated liquid to the measuring means.

15. In a meter for mixed liquid and gas under pressure, in combination, a closed casing, liquid measuring means therein including an open bucket wherein the gas can separate from the liquid by release of pressure, means to deliver the fluid into the bucket, a gas riser extending through the upper part of the casing, means therein to impart a rotary movement to the escaping gas, circumferential entrapping means lining said riser to receive the entrained liquid thrown from the gas by centrifugal force and means to gather said liquid and return it to said bucket.

16. A combined separator and meter for the mixed discharge of oil water and gas flowing under pressure thereinto from an oil well comprising in combination, a closed casing having a large volume by comparison to the entering pipe for the fluid, means to maintain a superatmospheric but lower pressure in the casing than in the well, means in the casing to measure the liquid volume discharged into the casing by filling and emptying, said measuring means during filling and emptying violently agitating the liquid and exposing a large surface thereof to permit the gas to separate therefrom, a pressure controlled gas outlet from the casing for the escape of the gas under its own pressure and means to discharge the oil under the gas pressure including a liquid seal to prevent the escape of gas.

BAILEY E. PRICE.